United States Patent
Thayer (10) Patent No.: US 6,362,824 B1
(45) Date of Patent: Mar. 26, 2002

(54) SYSTEM-WIDE TEXTURE OFFSET ADDRESSING WITH PAGE RESIDENCE INDICATORS FOR IMPROVED PERFORMANCE

(75) Inventor: Larry J Thayer, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/239,626

(22) Filed: Jan. 29, 1999

(51) Int. Cl.$^7$ .............................................. G06F 15/16
(52) U.S. Cl. ..................... 345/503; 345/552; 345/536; 345/567; 345/572
(58) Field of Search ............................... 345/419, 582, 345/587, 501, 503, 520, 545, 531, 532, 536, 552, 564, 572, 559, 567

(56) References Cited

U.S. PATENT DOCUMENTS

| | | | |
|---|---|---|---|
| 4,586,038 A | 4/1986 | Sims et al. ................. | 340/729 |
| 4,692,880 A | 9/1987 | Merz et al. ................. | 364/521 |
| 5,222,205 A | 6/1993 | Larson et al. ............... | 395/130 |
| 5,446,833 A | 8/1995 | Miller et al. ................ | 395/125 |
| 5,495,563 A | * 2/1996 | Winser ....................... | 395/130 |
| 5,606,650 A | 2/1997 | Kelley et al. ............... | 395/130 |
| 5,664,161 A | * 9/1997 | Fukushima et al. ......... | 345/501 |
| 5,886,705 A | * 3/1999 | Lentz ......................... | 345/430 |
| 6,002,407 A | * 12/1999 | Fadden ....................... | 345/430 |
| 6,130,680 A | * 10/2000 | Cox et al. ................... | 345/511 |
| 6,215,497 B1 | * 4/2001 | Leung ........................ | 345/419 |
| 6,243,081 B1 | * 6/2001 | Goris et al. ................. | 345/202 |

OTHER PUBLICATIONS

Lance Williams, Pyramidal Parametrics, Computer Graphics, vol. 17, No. 3, pp. 1–10 (Jul., 1983).
James F. Blinn, The Truth About Texture Mapping, IEEE Computer Graphics & Applications, Mar. 1990, pp. 78–83.

* cited by examiner

*Primary Examiner*—Ulka J. Chauhan
(74) *Attorney, Agent, or Firm*—Kevin M. Hart (57) ABSTRACT

A method and apparatus are disclosed for achieving improved mipmapped texture mapping performance in computer graphics systems. Page residence indicators obviate the need for address comparisons during texel accessing. A mipmap page number is generated for texture data of interest. A page residence bit is then selected responsive to the mipmap page number. If the page residence bit is in a first state, then the texture data is retrieved from a memory located within the graphics subsystem; but if the page residence bit is in a second state, then the texture data is retrieved from system memory. System-wide texture offset addressing obviates the constraints associated with fixed relative addressing schemes. To access texture data of interest, a mipmap page base address is generated responsive to the mipmap page number of the texture data of interest; an offset is generated responsive to the mipmap page number and the s,t coordinates of the texture data of interest; and the offset is added to the mipmap page base address to produce an absolute texel address. Because the mipmap page base address is generated responsive only to the mipmap page number, the various pages constituting a mipmap may be stored at random locations within the computer system.

26 Claims, 5 Drawing Sheets

SYSTEM-WIDE TEXTURE OFFSET ADDRESSING WITH PAGE RESIDENCE INDICATORS FOR IMPROVED PERFORMANCE

FIELD OF THE INVENTION

This invention relates to computer graphics. More particularly, the invention relates to techniques for accessing texture data stored in a computer for use in texture mapping operations by a graphics display subsystem.

BACKGROUND

In the field of computer graphics, texture mapping is a known technique used to create the appearance of complexity on the surface of rendered objects without actually having to model every detail of the object's surface. Typically, the technique involves mapping a two-dimensional function or array onto an object in three-dimensional object space and then projecting the resultant image back to two-dimensional screen space for display. The term "texture map" refers to the function or array that is used in the texture mapping process. A common array-based texture map might consist of a repeatable pattern for representing a material, such as wood or marble for example. Such texture maps are made up of a plurality of numerical values called texels. A texel's numerical value usually corresponds to an RGB color value and perhaps also to an alpha transparency value. (Although other parameters may be included in texture maps in addition to, or in lieu of, RGB and alpha values.) A texel's location within a texture map may be designated using s,t coordinates.

A technique known as mipmapping is also used in texture mapping. The acronym "mip" stands for multum in parvo— multiple things in one place. In mipmapping, numerous versions of the same texture map are created, each version representing the texture at a different resolution. After this has been done, the process of texture mapping may be performed using only those versions of the texture map that are appropriate given the resolution required for the object being drawn. To create the different versions of the texture map, a base texture map is down-sampled numerous times to develop a series of smaller texture maps, each of which represents the base map at a predetermined lower level of resolution. A more detailed explanation of mipmapping may be found, for example, in Lance Williams, "Pyramidal Parametrics," Computer Graphics Vol. 17, No. 3, pp.1–10 (July, 1983). Hereinafter, the different resolution versions of a texture map that in the aggregate constitute a mipmap will be referred to as "pages," or "mipmap pages."

While mipmaps yield important efficiencies for rendering complex images, they can become burdensome in terms of the amount of memory that is required to store them. Indeed, the size of the mipmaps used to render an image can in some cases be larger than the rendered image itself. This is particularly problematic given that, in the past, texture data was stored exclusively within the graphics subsystem (such as in the frame buffer memory or in a dedicated texture memory). One technique now being used to work around the texture data storage problem is to store mipmaps in the system memory of the host computer as well as in memory located within the graphics subsystem. When this technique is employed, the graphics subsystem uses direct memory access to retrieve texture data from system memory as needed. This new technique is beneficial to the extent that it reduces the need for expensive memory in the graphics subsystem. (Ample and relatively inexpensive storage space is often available in system memory.) Unfortunately, the technique also creates new problems:

First, there is overhead associated with retrieving texture data from system memory into graphics subsystem memory. For example, each time a texel address is generated by graphics rendering hardware, the graphics subsystem must determine whether to initiate a direct memory access request to system memory for the required texel data, or whether simply to retrieve the texel data from a memory located locally within the graphics subsystem. In prior art machines, a texture address comparator is provided for this purpose. Reference addresses are stored to indicate the boundaries of system memory and graphics subsystem memory. Every time a texel address is generated, it is compared with the reference addresses to determine whether a direct memory access will be required. Texel addresses are generated with enormous frequency, and each address comparison takes time. Thus, storing texture data in system memory can reduce the performance of a graphics system even when texture data is not being moved from system memory to graphics subsystem memory. The extra hardware required to perform the address comparison function has a cost associated with it as well. It is therefore an object of the invention to provide a mechanism and technique for very quickly determining whether it is necessary to access the system memory of the host computer for the purpose of retrieving a particular unit of texture data.

Another problem that arises with storage of texture data in system memory has to do with fixed relative addressing. In prior art systems that use fixed relative addressing, all of the pages of a mipmap must be located within the same memory in order to be used. In other words, the texels in a mipmap structure can be accessed individually only as long as all of the pages of the mipmap are located either in system memory, frame buffer memory or texture memory. It is not permitted in such systems to locate one of the pages of a mipmap in frame buffer memory and the remaining pages in system memory, for example. This is because, in fixed relative addressing, the location of each texel in a mipmap is defined relative to the beginning address of the base page of the overall mipmap structure.

Figure 1:
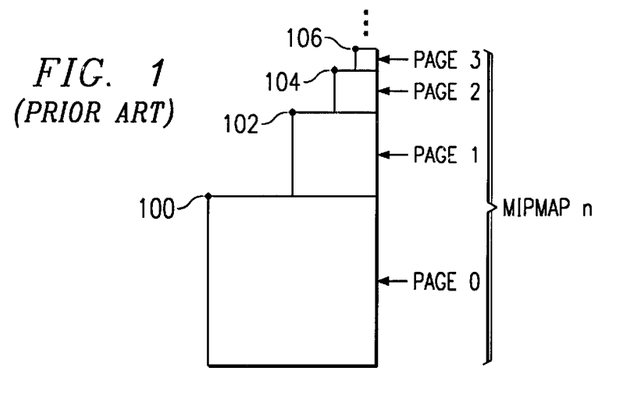
FIG. 1 is a block diagram illustrating the components of a typical mipmap.

For example, referring now to FIG. 1, the pages of a mipmap n are used to represent one texture at varying levels of detail. The largest page of mipmap n, page 0, is used to represent the texture at the highest level of detail. Pages 1, 2 and 3 are used to represent the same texture at successively lesser levels of detail. Each of pages 1, 2 and 3 is a down-sampled version of the previous page. If page 0 were 256×256 texels in size, then pages 1, 2 and 3 would typically be 128×128, 64×64 and 32×32 texels in size, respectively. Each of the pages in mipmap n has a base address associated with it, indicated in the drawing at 100–106. In a fixed relative addressing scheme, the pages of a mipmap n are stored in memory in such a manner that only the base address of page 0 need be known in order to access texels within any of the pages of the mipmap n. In short, the base address location for a given page is "fixed" relative to the base addresses for the other pages in the same mipmap. The base address for page 0 of the mipmap is used as the primary point of reference. For example, the pages may be stored contiguously so that the base address for page 1 will always be equal to [the base address for page 0]+65,536*[size of a texel]. The base address for page 2 will be equal to [the base address for page 1]+16,384*[size of a texel], and so on. Alternatively, the pages of the mipmaps may be stored so that they are not contiguous with one another, so long as the base addresses for each of the down-sampled pages of a given mipmap may calculated solely from the base address of page 0 of that mipmap.

Although fixed relative addressing provides simplicity, it also involves constraints. For instance, in some applications it would be desirable to have some of the frequently-accessed pages of a mipmap reside in (fast) graphics subsystem memory and to have some of the less-frequently-accessed pages of the mipmap reside in (slower) system memory. In a system that uses fixed relative addressing, such a scheme is not possible. It is therefore a further object of the invention to provide the flexibility to store the pages of a mipmap at random locations either within the system memory of the host computer, in a frame buffer memory or in a dedicated texture memory.

SUMMARY OF THE INVENTION

The invention includes a number of unique aspects, each of which contributes to the achievement of the above-stated objects.

In one aspect, the invention includes the use of page residence indicators to obviate the need for address comparisons during texel accessing. A mipmap page number is generated for texture data of interest. A page residence bit is then selected responsive to the mipmap page number. If the page residence bit is in a first state, then the texel is retrieved from a memory located within the graphics subsystem; but if the page residence bit is in a second state, then the texel is retrieved from system memory. The step of selecting a page residence bit may include the step of decoding the mipmap page number to select one of a plurality of page residence registers in a register file.

In another aspect, the invention includes the use of system-wide texture offset addressing to obviate the constraints associated with fixed relative addressing schemes. To access texture data of interest, a mipmap page base address is generated responsive to the mipmap page number of the texture data of interest; an offset is generated responsive to the mipmap page number and the s,t coordinates of the texture data of interest; and the offset is added to the mipmap page base address to produce an absolute texel address. Because the mipmap page base address is generated responsive only to the mipmap page number, the various pages constituting a mipmap may be stored at random locations within the computer system. The step of generating a mipmap page base address may include the steps of applying the mipmap page number to the output select input of a register file; and taking the mipmap page base address from the output of the register file.

DETAILED DESCRIPTION OF THE PREFERRED EMBODIMENTS

The preferred embodiments of the invention will now be described in detail, first with reference to their architecture and then with reference to their functional behavior.

ARCHITECTURE

Figure 2:
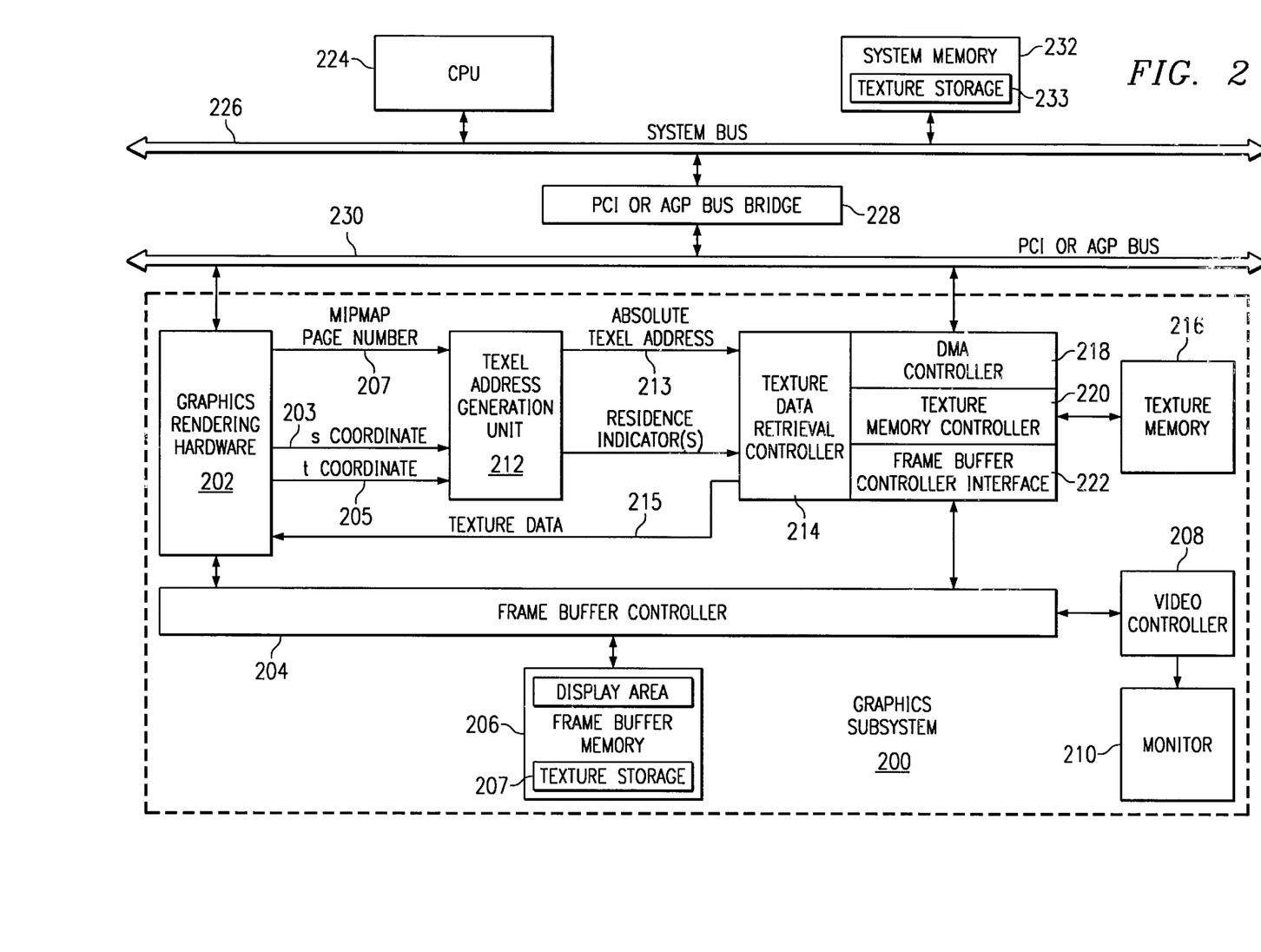
FIG. 2 is a schematic diagram illustrating a computer having a system memory and a graphics subsystem according to a preferred embodiment of the invention.

FIG. 2 illustrates a computer system having a graphics subsystem implemented therein according to a preferred embodiment of the invention. Graphics subsystem 200 resides in a host computer system that includes a CPU 224 and a system memory 232. Typically, CPU 224 and system memory 232 are coupled to one another via a system bus 226. Graphics subsystem 200 is coupled to system bus 226 via PCI or AGP bus 230 and bus bridge 228. The components and bus architecture of the host computer system shown in the drawing are meant to be illustrative only. The invention may also be implemented in a variety of other host computer systems.

In general, CPU 224 executes instructions corresponding to application software stored in system memory 232, and in the course of doing so issues graphics rendering commands to graphics rendering hardware 202 via PCI or AGP bus 230. Graphics rendering hardware 202, in turn, generates pixel data for frame buffer memory 206 responsive to the graphics rendering commands issued by CPU 224. Video controller 208 will typically include R,G and B digital-to-analog converters and other driver circuitry necessary to display the pixel data from frame buffer memory 206 on a display device such as monitor 210. Graphics rendering hardware 202 may be implemented according to any of a number of conventional means so long as it is able to produce s,t coordinates and mipmap page numbers for texels that correspond to pixels during rendering, as indicated in the drawing by buses 203, 205 and 207, respectively.

Texture mapping performance is provided by texel address generation unit 212, texture data retrieval controller 214, DMA controller 218, frame buffer memory controller 222 and (optionally) texture memory controller 220 and texture memory 216. Among the unconventional aspects of graphics subsystem 200 are the existence and characteristics of texel address generation unit 212 and texture data retrieval controller 214, as well as the manner in which those units allow texture data to be stored in and retrieved from frame buffer memory 206, system memory 232 and (optionally) texture memory 216.

Figure 3:
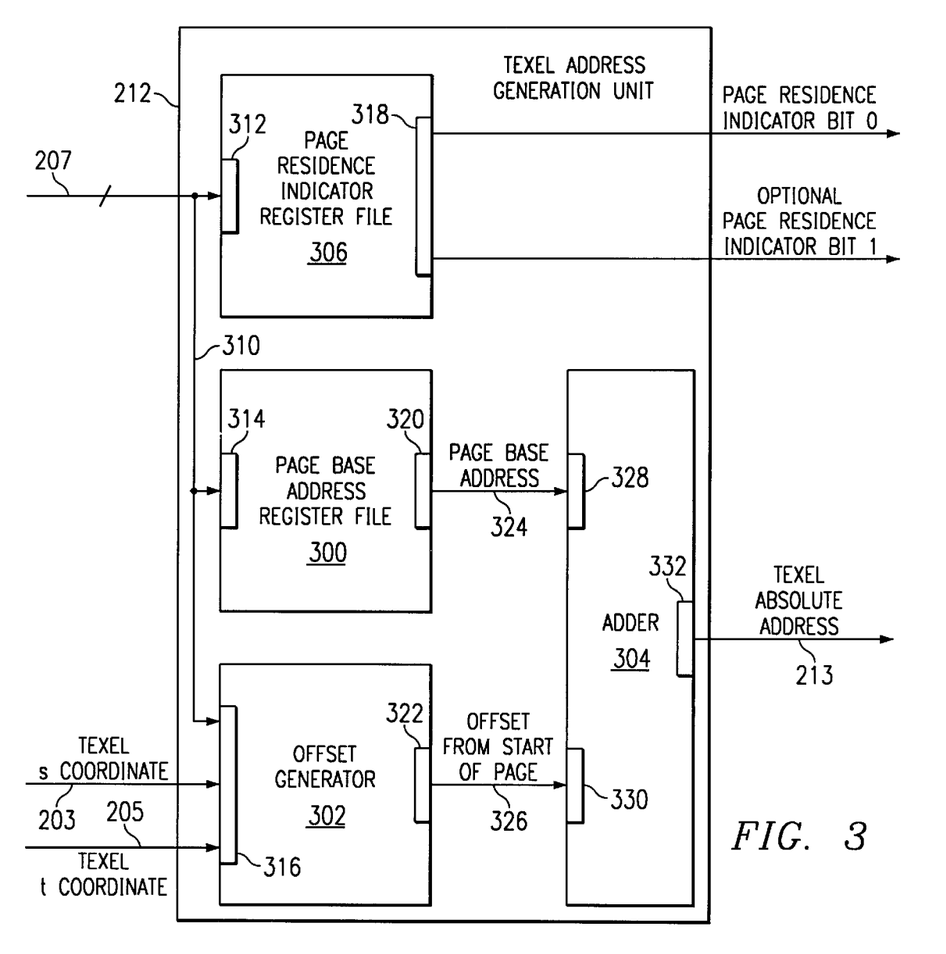
FIG. 3 is a schematic diagram illustrating the texel address generation unit of FIG. 2 in more detail.

FIG. 3 illustrates a preferred embodiment of texel address generation unit 212 in more detail. Texel address generation unit 212 includes a page base address register file 300, an offset generator 302, an adder 304 and a page residence indicator register file 306. Bus 310 applies mipmap page number 207 to the output select inputs 312 and 314 of register files 306 and 300, respectively. Bus 310 also applies mipmap page number 207 to one of the inputs 316 of offset generator 302. The other inputs 316 of offset generator 302 are coupled to texel s and t coordinates 203 and 205, as shown. The output 318 of page residence indicator register file 306 supplies page residence indicator bits 0 and 1. The output 320 of page base address register file 300 supplies a page base address 324. The output 322 of offset generator 302 supplies an offset from start of page 326. Page base address 324 is coupled to one addend input 328 of adder 304. Offset 326 is coupled to the other addend input 330 of adder 304. The output 332 of adder 304 supplies texel absolute address 213, which is the sum of page base address 324 and offset 326.

Figure 4:
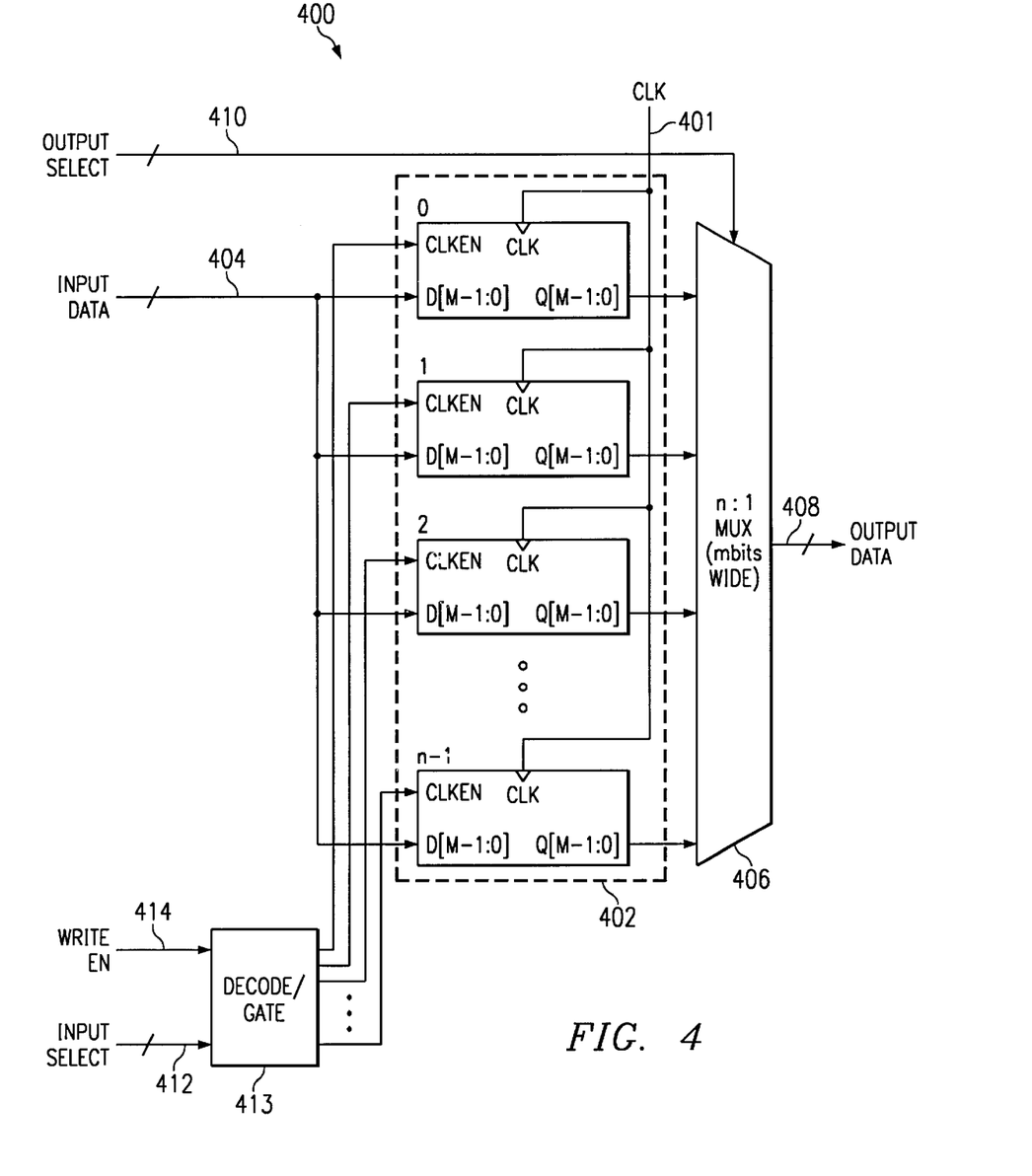
FIG. 4 is a schematic diagram illustrating an example implementation for the register files shown in FIG. 3.

Register files 306 and 300 may be implemented in accordance with the general example provided in FIG. 4. Example register file 400 includes an array 402 of n m-bit registers, each register having its clock input coupled to a common clock signal 401, as shown. Input data bus 404 is m bits wide and is coupled to the data inputs of each of the n registers in array 402. The m-bit data outputs of the registers in array 402 are coupled to an m-bit-wide n:1 multiplexer 406. Output data bus 408 is m bits wide and will reflect the output of one of the n registers in array 402 as determined by the state of output select bus 410. New data may be loaded into any one of the registers in array 402 synchronous to clock 401 by applying the new data to input data bus 404, applying the number of the target register to input select bus 412, and applying a pulse to write signal 414.

Figure 5:
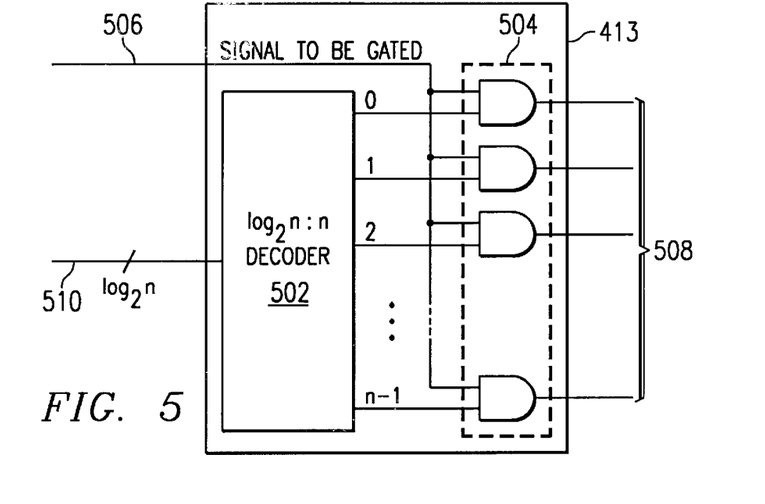
FIG. 5 is a schematic diagram illustrating an example implementation for the decode/gate block of FIG. 4.

FIG. 5 shows an example implementation for decode/gate block 413. Example decode/gate block 413 includes a $\log_2 n$:n decoder 502 and a series of two-input AND gates 504. One input of each of AND gates 504 is coupled to one of the outputs of decoder 502. The other input of each of AND gates 504 is coupled to a signal to be gated 506. The result of this circuit arrangement is that only one of outputs 508 of decode/gate block 413 will be active at any given time as determined by select inputs 510. Whichever one of outputs 508 is active will follow the state of signal to be gated 506.

In an alternative embodiment, either or both of register files 306, 300 may be implemented as lookup tables. It is believed, however, that better performance will be realized using the implementation illustrated herein.

In another alternative embodiment, the width of each of the registers in page base address register file 300 may be enlarged to include page residence bits 0 and 1; in such an embodiment, only one register file is needed to serve the functions of register files 300 and 306. Thus, register file 306 may be eliminated.

FUNCTIONAL BEHAVIOR

Figure 6:
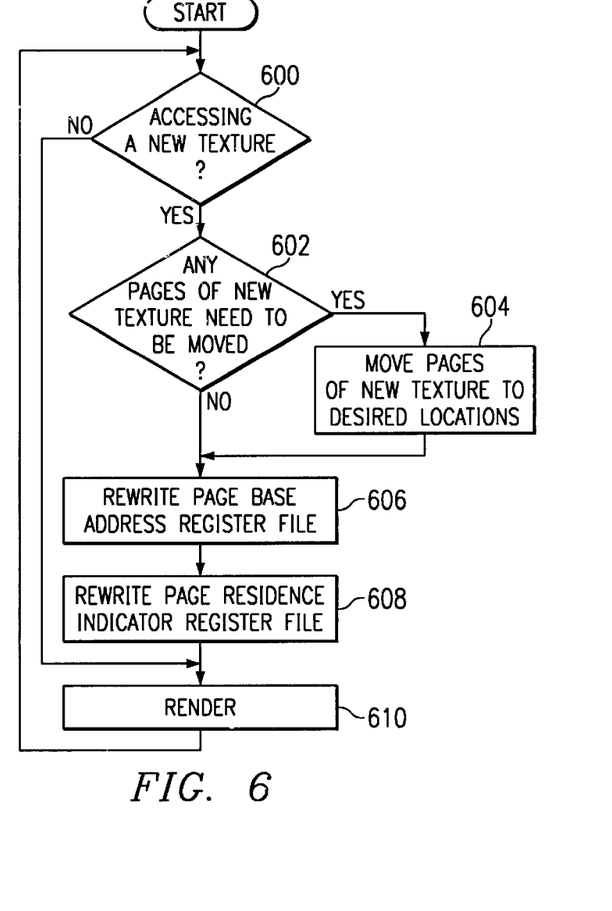
FIG. 6 is a flow diagram illustrating preferred interaction between application software and the graphics subsystem of FIG. 2.

In a preferred embodiment, application software executing on CPU 224 follows the steps described in FIG. 6. In the process of rendering images into frame buffer memory 206, the application software determines in step 600, for the current rendering operation, whether it is about to access a new texture or whether it is merely accessing the same texture that was accessed in previous rendering operations. If a new texture is about to be accessed, then the decision is made at step 602 whether any pages of the new texture need to be moved. If so, then pages of the new texture are moved in step 604. For example, mipmap pages may be moved from texture storage area 233 in system memory 232 to texture memory 216, or to texture storage area 207 in frame buffer memory 206. Then, in step 606, page base address register file 300 is rewritten so that the base address for each mipmap page of the new texture is stored in the register whose select code corresponds to the mipmap page number for that mipmap page. Next, in step 608, page residence indicator register file 306 is rewritten according to Table 1 below.

TABLE 1

| Page Residence Indicator Bit 0 | Page Residence Indicator Bit 1 | Intetpretation |
|---|---|---|
| 0 | Don't Care | Page is resident in system memory. |
| 1 | 0 | Page is resident in texture memory. |
| 1 | 1 | Page is resident in frame buffer. |

In step 610, a rendering operation is performed. Rendering operations will continue to be performed until it is determined in step 600 that a new texture is about to be accessed. During rendering step 610, it is contemplated that s,t coordinates and mipmap page numbers will be passed to texel address generation unit 212, and that texture data will be passed from texture data retrieval controller 214 to graphics rendering hardware 202 in response. In systems that interpolate between mipmap pages to produce a more accurate texel value for a pixel (e.g., systems that use trinear interpolation), performance may be enhanced as follows: For a given level of detail ("LOD") value, two integers should be produced, one by rounding down the LOD value to the next lowest integer, and the other by rounding up the LOD value to the next highest integer. The two integers so produced should then be passed to texel address generation unit 212 as mipmap page numbers. In systems that do not interpolate between mipmap pages (e.g., systems that use only bilinear interpolation), a single integer should be produced by rounding the LOD value up or down to the closest integer. This integer should then be passed to texel address generation unit 212 as a mipmap page number.

Figure 7:
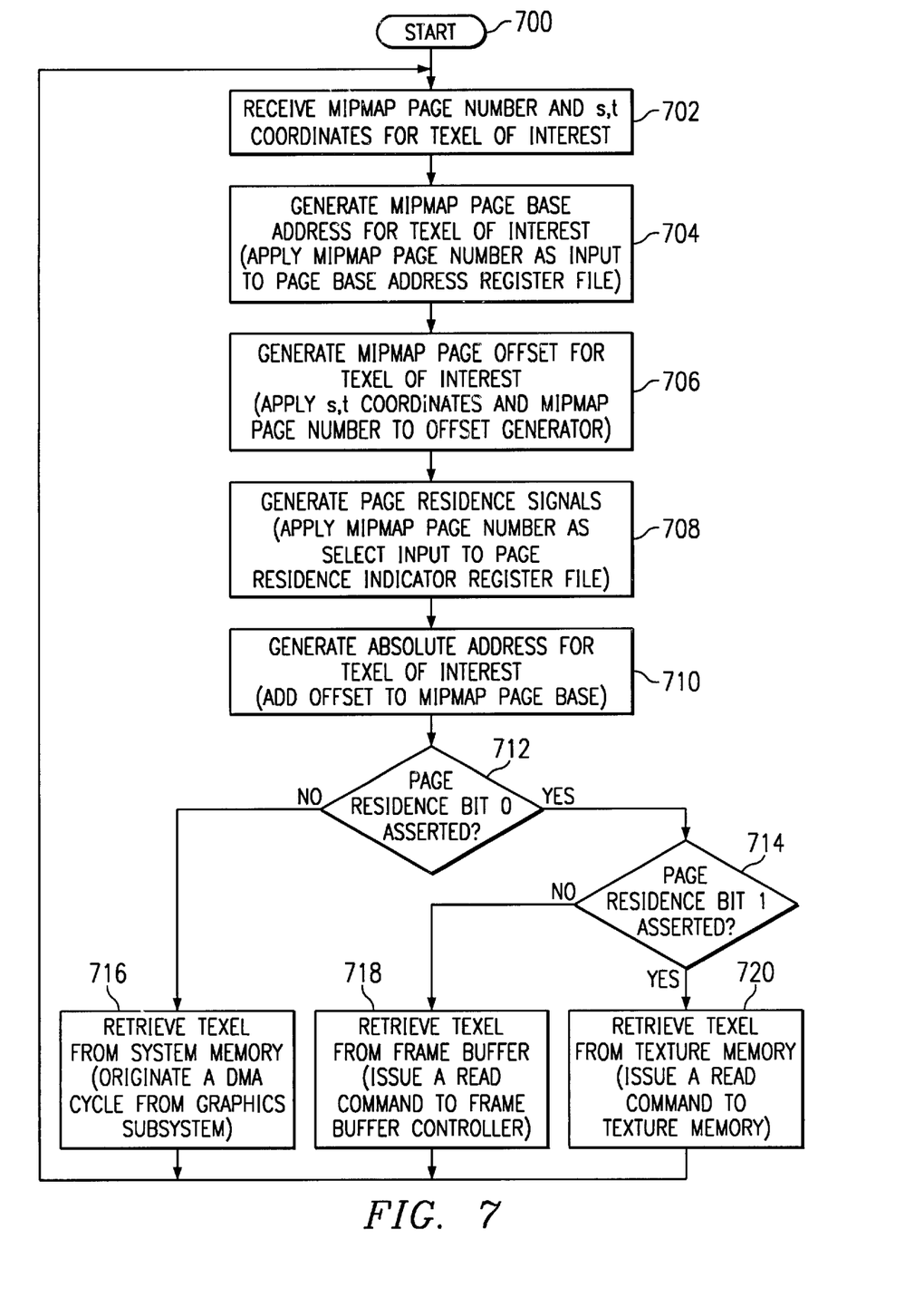
FIG. 7 is a flow diagram illustrating preferred functionality within the graphics subsystem of FIG. 2.

FIG. 7 illustrates preferred functionality within the graphics subsystem of FIG. 2. In step 702, texel address generation unit 212 receives s,t coordinates and mipmap page numbers from graphics rendering hardware 202. Preferably, the mipmap page numbers are produced according to the method described above in the immediately preceding paragraph. In step 704, a mipmap page base address is generated by applying the mipmap page number to output select input 314 of page base address register file 300 and taking page base address 324 from output 320 of register file 300. In step 706, an offset from the start of a mipmap page is generated by applying the mipmap page number 310, as well as texel s,t coordinates 203, 205 to the inputs of offset generator 302.

The means by which offset generator 302 generates offset 326 will vary depending on how texels are organized within the mipmap pages. Generally, however, the pages of a mipmap differ from one another in size by factors of 2. Therefore, offsets of corresponding texels in the various pages of a mipmap structure may be determined simply by a binary shift of the s,t coordinates for the base page texel. For example, to access a texel in page 2 as an offset from base address 104, the s,t coordinates of that texel in page 0 would be right shifted by 2 bits. In systems that employ a tiling scheme for texture data, the shifted bits of the s,t coordinate pair are then blended together—typically by a logical OR operation—to form a final offset from base address 104 of page 2. (For a more detailed discussion of tiling schemes, see for example James Blinn, "The Truth About Texture Mapping," IEEE Computer Graphics & Applications, March 1990, pp. 78–83.) If the value of base address 104 is known, the newly-calculated offset may then be added to base address 104 to create an absolute address for the texel of interest.

In step 708, page residence indicator bits 0 and 1 are generated by applying the mipmap page number to the output select input 312 of page residence indicator register file 306 and taking page residence indicator bits 0 and 1 from output 318 of register file 306. In step 710, texel absolute address 213 is generated by applying page base address 324 and offset 326 to addend inputs 328 and 330, respectively, of adder 304. Texel absolute address 213 is taken from the sum output 332 of adder 304.

In step 712, the states of the page residence indicator bits are determined. If bit 0 is not asserted, then operation continues with step 716. In step 716, texture data retrieval controller 214 forwards absolute texel address 213 to DMA controller 218. In turn, DMA controller 218 uses a DMA cycle to retrieve the required texel from system memory 232. Finally, texture data retrieval controller 214 forwards the retrieved texel to graphics rendering hardware 202 via texture data bus 215.

If it is determined in step 712 that page residence indicator bit 0 is asserted, then the state of page residence indicator bit 1 is tested in step 714. If page residence indicator bit 1 is asserted, then operation continues with step 720. In step 720, texture data retrieval controller 214 forwards absolute texel address 213 to texture memory controller 220. Texture memory controller 220 reads the required texel from texture memory 216, and texture data retrieval controller 214 forwards the retrieved texel to graphics rendering hardware 202 via texture data bus 215.

On the other hand, if it is determined in step 714 that page residence indicator bit 1 is unasserted, then operation continues at step 718. In step 718, texture data retrieval controller 214 forwards absolute texel address 213 to frame buffer controller interface 222. Frame buffer controller interface 222 reads the required texel from frame buffer memory 206 via frame buffer controller 204, and texture data retrieval controller 214 forwards the retrieved texel to graphics rendering hardware 202 via texture data bus 215.

While the invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that will remain within the scope of the appended claims.

What is claimed is:

1. A method of accessing texture data in a computer having a system memory and a graphics subsystem, the method comprising the steps of:

generating a mipmap page number corresponding to the texture data;

decoding the mipmap page number to select one of a plurality of page residence registers comprising a page residence bit; and if the page residence bit is in a first state, retrieving the texture data from a memory located within the graphics subsystem;

but if the page residence bit is in a second state, retrieving the texture data from the system memory.

2. A method according to claim 1, fiber comprising the steps of:

storing a mipmap page in the memory located within the graphics subsystem; and setting the state of the page residence indicator bit in the page residence register that corresponds to the number of the mipmap page stored.

3. A method according to claim 1, wherein the step of retrieving the texture data from the system memory comprises the step of:

issuing a direct memory access cycle from the graphics subsystem to the system memory.

4. A method according to claim 1, wherein the step of retrieving the texture data from the memory located within the graphics subsystem comprises the step of:

issuing a read command from a frame buffer controller to a frame buffer memory.

5. A method according to claim 1, wherein the step of retrieving the texture data from the memory located within the graphics subsystem comprises the step of:

issuing a read command from a texture memory controller to a dedicated texture memory.

6. A method according to claim 1, wherein the step of generating the mipmap page number comprises the steps of:

calculating a level-of-detail value;

rounding the level-of-detail value up to a next highest integer; and setting the mipmap page number equal to the next highest integer.

7. A method according to claim 1, wherein the step of generating the mipmap page number comprises the steps of:

calculating a level-of-detail value;

rounding the level-of-detail value down to a next lowest integer; and setting the mipmap page number equal to the next lowest integer.

8. A method according to claim 1, wherein the step of generating the mipmap page number comprises the steps of:

calculating a level-of-detail value;

rounding the level-of-detail value to a next closest integer; and setting the mipmap page number equal to the next closest integer.

9. A method according to claim 1, further comprising the steps of:

generating a mipmap page base address responsive to the mipmap page number;

generating an offset responsive to the mipmap page number and to s and t coordinates of the texture data; and adding the offset to the mipmap page base address to produce an absolute texel address.

10. A method according to claim 9, wherein:

the step of retrieving the texture data from a memory located within the graphics subsystem is performed responsive to the absolute texel address.

11. A method according to claim 9, wherein:

the step of retrieving the texture data from the system memory is performed responsive to the absolute texel address.

12. A method according to claim 9, wherein the step of generating a mipmap page base address comprises the steps of:

applying the mipmap page number to a select input of a random-access page base address storage structure; and taking the mipmap page base address from the output of the random-access page base address storage structure.

13. A method according to claim 12, wherein the random-access page base address storage structure is a register file.

14. A method according to claim 12, wherein the random-access page base address storage structure is a lookup table.

15. A method according to claim 12, wherein the page residence bit is also taken from the output of the random-access page base address storage structure.

16. Circuitry for accessing texture data stored in a computer, comprising:

a random-access page base address storage structure;

an offset generator;

circuitry for coupling a mipmap page number to an output select input of the random-access page base address storage structure;

circuitry for coupling the mipmap page number and the s and t coordinates of the texture data to inputs of the offset generator; and adder circuitry having a first addend input coupled to the output of the page base address storage structure and a second addend input coupled to the output of the offset generator, the adder circuitry for producing a texel absolute address at a sum output responsive to the first and second addend inputs.

17. Circuitry according to claim 16, further comprising:

page residence indicator circuitry having a select input coupled to the mipmap page number, the page residence indicator circuitry for selecting a page residence bit responsive to the select input and reflecting the state of the page residence bit at a page residence indicator output.

18. Circuitry according to claim 17, wherein the page residence indicator circuitry comprises:

a plurality of registers;

decoder circuitry for selecting one of the plural registers responsive to the select input.

19. Circuitry according to claim 18, further comprising:

texture data retrieval circuitry coupled to the page residence indicator output and to the sum output of the adder circuitry;

wherein the texture data retrieval circuitry is operable to use the absolute texel address present at the sum output of the adder circuitry to retrieve the texture data from first and second alternative locations depending on the state of the page residence indicator output.

20. Circuitry according to claim 19, wherein the first alternative location is a memory located within a graphics subsystem of a computer.

21. Circuitry according to claim 20, wherein the second alternative location is a system memory of the computer.

22. Circuitry according to claim 21, wherein the first alternative location is a frame buffer memory.

23. Circuitry according to claim 21, wherein the first alternative location is a texture memory.

24. A Circuitry according to claim 18, wherein the page residence bit is contained within the random-access page base address storage structure.

25. Circuitry according to claim 17, wherein the random-access page base address storage structure is a register file.

26. Circuitry according to claim 17, wherein the random-access page base address storage structure is a lookup table.

* * * * *

UNITED STATES PATENT AND TRADEMARK OFFICE
CERTIFICATE OF CORRECTION

PATENT NO. : 6,362,824 B1
DATED : March 26, 2002
INVENTOR(S) : Thayer

It is certified that error appears in the above-identified patent and that said Letters Patent is hereby corrected as shown below:

Column 5,
Line 60, delete "Intetpretation" and insert therefor -- Interpretation --

Column 7,
Line 50, delete "fiber" and insert therefor -- further --

Column 9,
Line 23, delete "claim 18" and insert therefor -- claim 17 --

Column 10,
Lines 12 and 15, delete "claim 21" and insert therefor -- claim 20 --
Line 17, before "Circuitry" delete "A"
Line 17, delete "claim 18" and insert therefor -- claim 17 --
Lines 20 and 22, delete "claim 17" and insert therefor -- claim 16 --

Signed and Sealed this

Seventh Day of December, 2004

JON W. DUDAS
*Director of the United States Patent and Trademark Office*